Nov. 10, 1942.  D. J. HENNESSY ET AL  2,301,401
APPARATUS FOR MAKING PHOTOMETRIC DETERMINATIONS
Filed April 6, 1940  4 Sheets-Sheet 1

INVENTORS
Erich Loewenstein
Douglas Hennessy
BY
[signature]
ATTORNEY

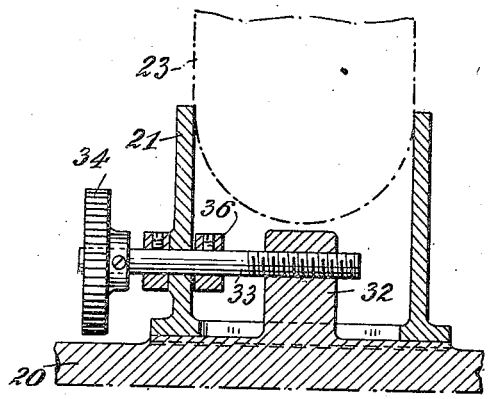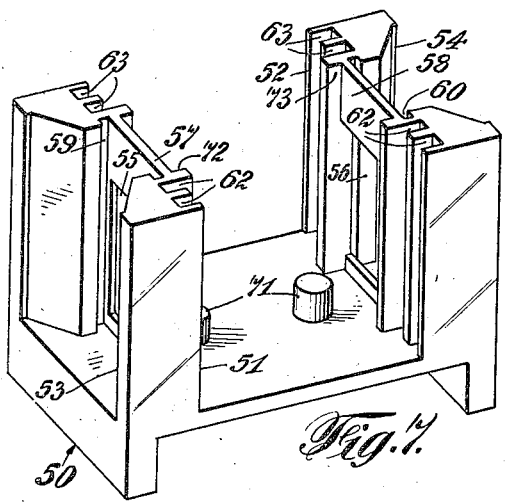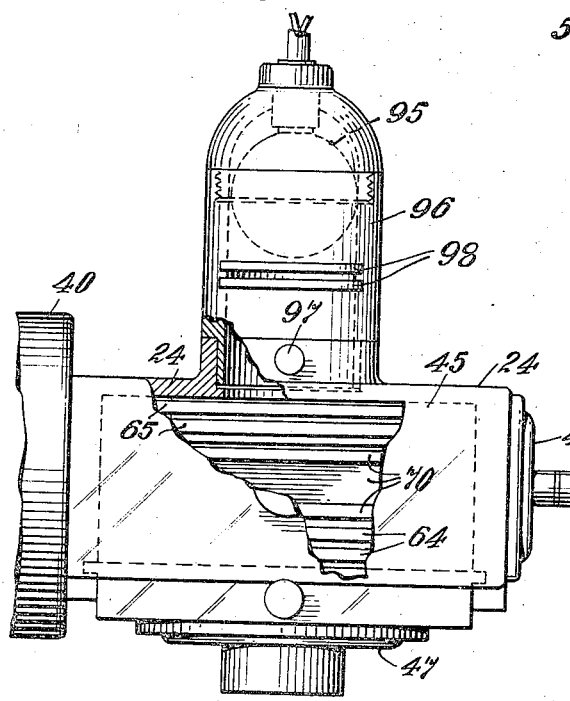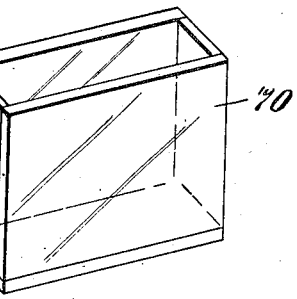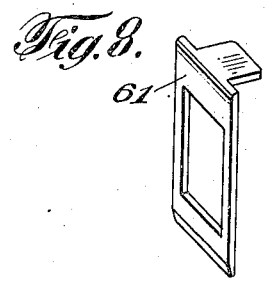

Nov. 10, 1942.  D. J. HENNESSY ET AL  2,301,401
APPARATUS FOR MAKING PHOTOMETRIC DETERMINATIONS
Filed April 6, 1940  4 Sheets-Sheet 4
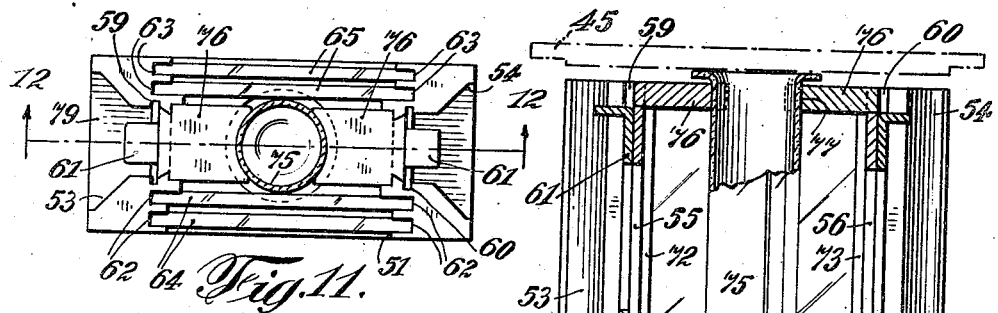
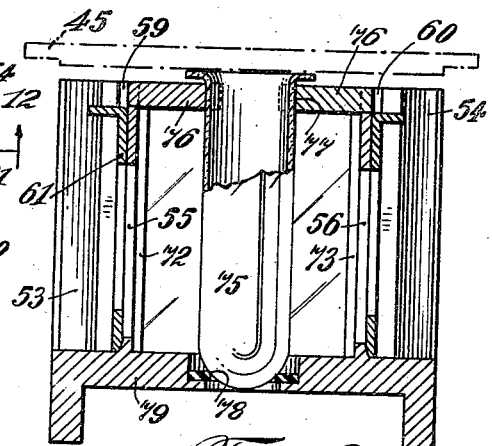
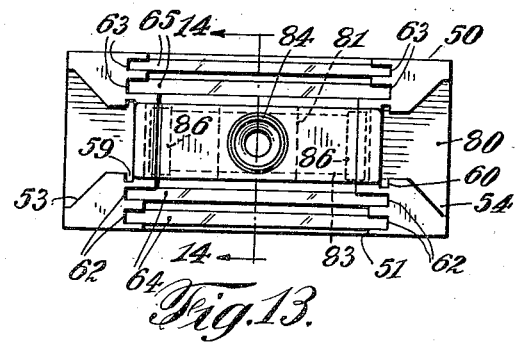
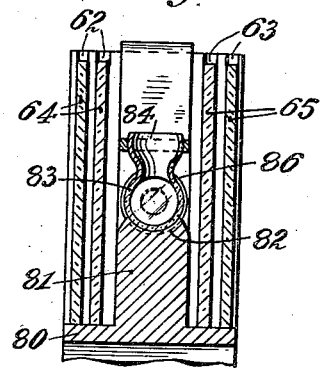
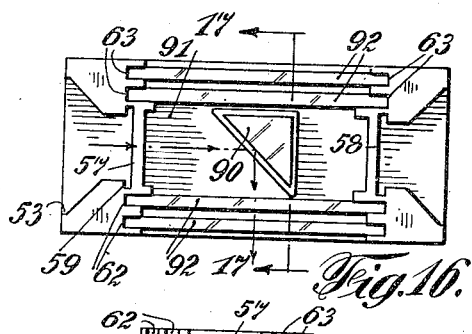
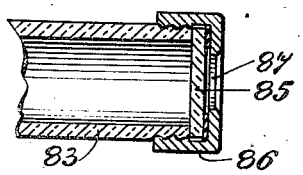
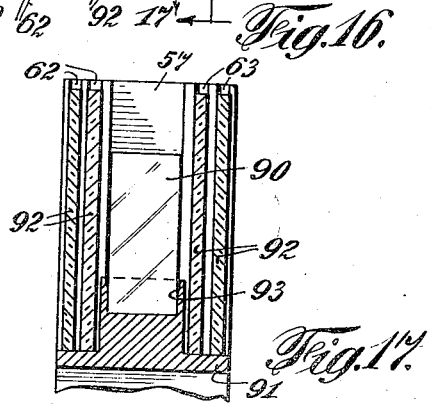
INVENTORS
ATTORNEY Patented Nov. 10, 1942

2,301,401

UNITED STATES PATENT OFFICE 2,301,401

APPARATUS FOR MAKING PHOTOMETRIC DETERMINATIONS

Douglas J. Hennessy, Teaneck, N. J., and Erich Loewenstein, Flushing, N. Y., assignors to Pfaltz & Bauer, Inc., New York, N. Y., a corporation of New York Application April 6, 1940, Serial No. 328,212

4 Claims. (Cl. 88—14)

The invention relates to apparatus for making photometric determinations, more especially in the measurement of fluorescence, color, turbidity, etc., of liquids and solutions, although by substitution of certain parts also determinations with respect to powders may be made. Such apparatus has been found particularly desirable in vitamin research work, for example, in the determination of the vitamins $B_1$ and $B_2$ (vitamin G) content of foodstuffs, oils and various materials.

It has for an object apparatus which will admit of the rapid and precise determination of such content in solutions of foodstuffs, dairy products, baking, pharmaceutical products, cereals, yeast, etc.; also in the determination of the fluorescence of material such as oil, petroleum, paper, paint and dyestuffs, as well as in the examination of fluorescent chemicals; also, in connection with biological work and metabolic studies.

A further object is to provide simple portable apparatus adapted to various determinations which may be made by ready adjustments and modifications in the general arrangement of the apparatus.

The invention has for another object the elimination of errors of visual colorimetry due to eye fatigue and objectivity of readings; and to enable determinations to be made with respect to rapidly fading solutions and comparisons of various shades and gradations in color and turbid solutions, as well as the detection of minute amounts of fluorescent materials or materials which can be modified to fluoresce.

In carrying out the invention, provision is made for directing a beam of light, of a character suited to the particular determination, upon the matter under test, and for measuring the effect of the light-rays, as modified thereby upon a photo-electric cell. As a source of light, a mercury-vapor lamp, a sodium, zinc or cadmium vapor lamp, and various spectral vapor lamps may be used; also, other monochromatic sources of light, such as lamps filled with helium, argon, and neon gas, etc.; as well as an ordinary Mazda lamp.

In the novel apparatus, a suitable mount is provided for the lamp which is adjustable to align the beam or pencil of light to the optical axis of the complete unit; and diaphragm and filter means are arranged for association therewith to modify the beam and secure the desired wave length. The filters may conveniently be inserted in grooves provided in a barrel extending axially from the housing for the lamp for an appreciable length to avoid overheating of a sample and the photo-electric cell. Suitable light-shielding means are movable thereover to enclose the inserted filters and shut out extraneous light. The beam of light is then directed through a further housing or measuring casing designed for receiving a removable carrier with a container for the material under test, said carrier being open at the ends and sides and arranged to receive a diaphragm or diaphragms as well as to retain one or more filters. In line with the beam and beyond the container for the material is mounted a photo-electric cell, and there is positioned also laterally of the beam a further cell.

Opposite this latter cell the wall of the housing retaining the carrier is provided with an opening in the axis of said cell and normally closed by a plug which may be removed for substitution by a different source of light which may thus be brought close to a sample and the rays of which are then adapted to pass transversely of the carrier. Or, a further cell may be substituted.

Spectrophotometric, interferometric, polarimetric, etc., measurements may be readily effected by the various expedients; and there is afforded a means for providing results in colorimetric work as for routine measurement and control, also concentration of colored solutions through measurement of the light absorption.

Different forms of the carrier may be provided for retaining various types of containers for materials to be tested.

Through the provision of a suitable control panel, either of the two said photo-electric cells, or both for differential measurements, may be connected with suitable measuring and/or control apparatus for measuring or otherwise making use of the response of a said cell, as is well understood.

The nature of the invention, however, will best be understood when described in connection with the accompanying drawings, in which.

Figure 1:
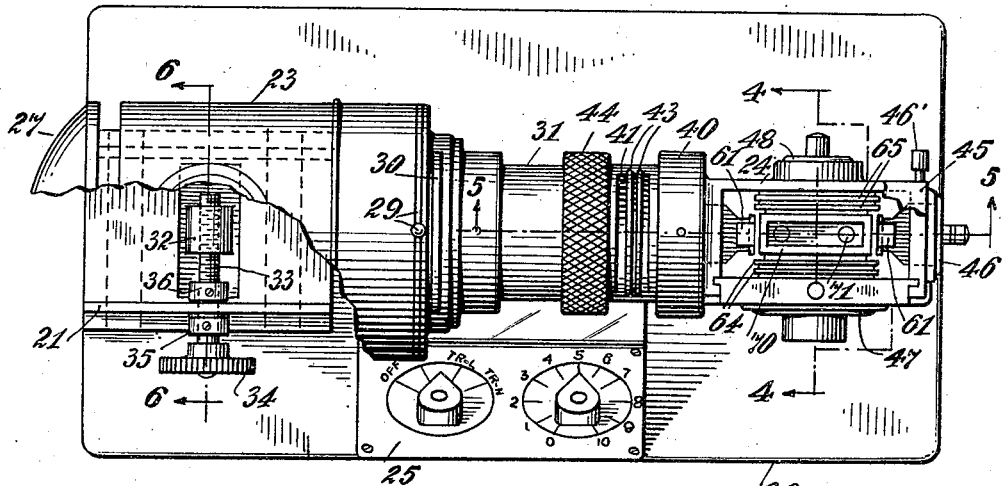
Figure 1 is a plan view of the novel apparatus with a portion broken away.
Figure 2:
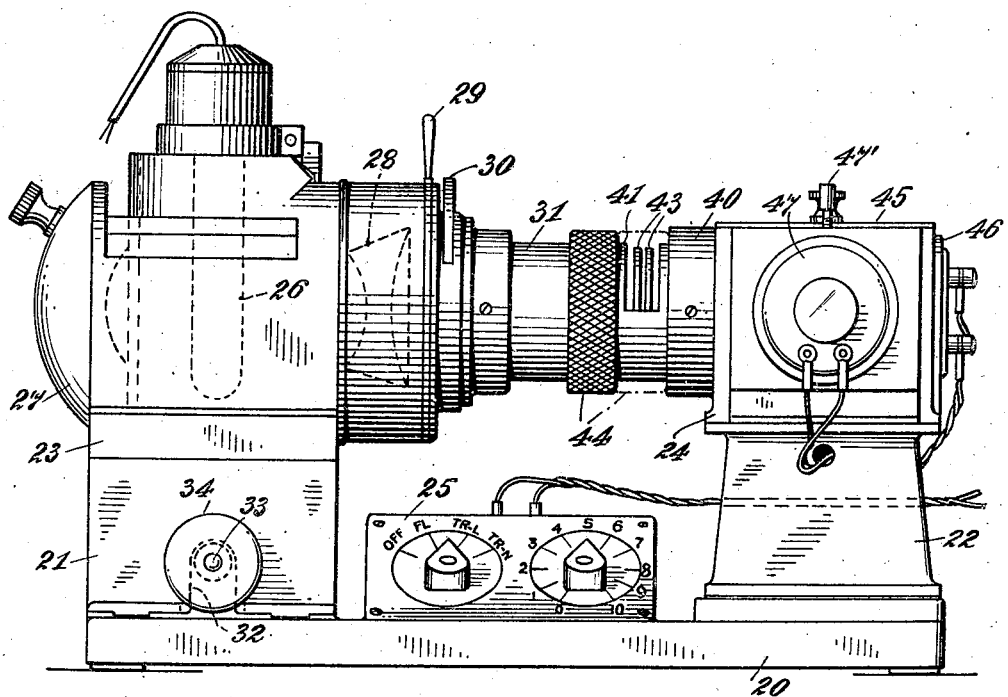
Figure 2 is a front elevation thereof.
Figure 3:
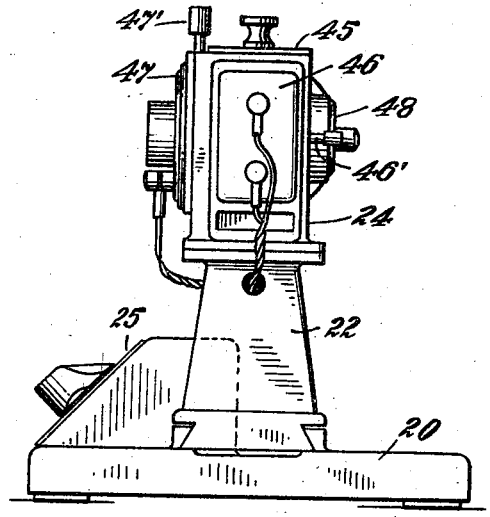
Figure 3 an end elevation.
Figure 4:
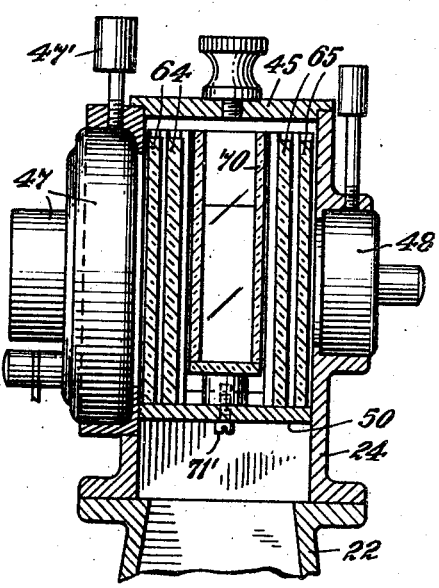
Figure 5:
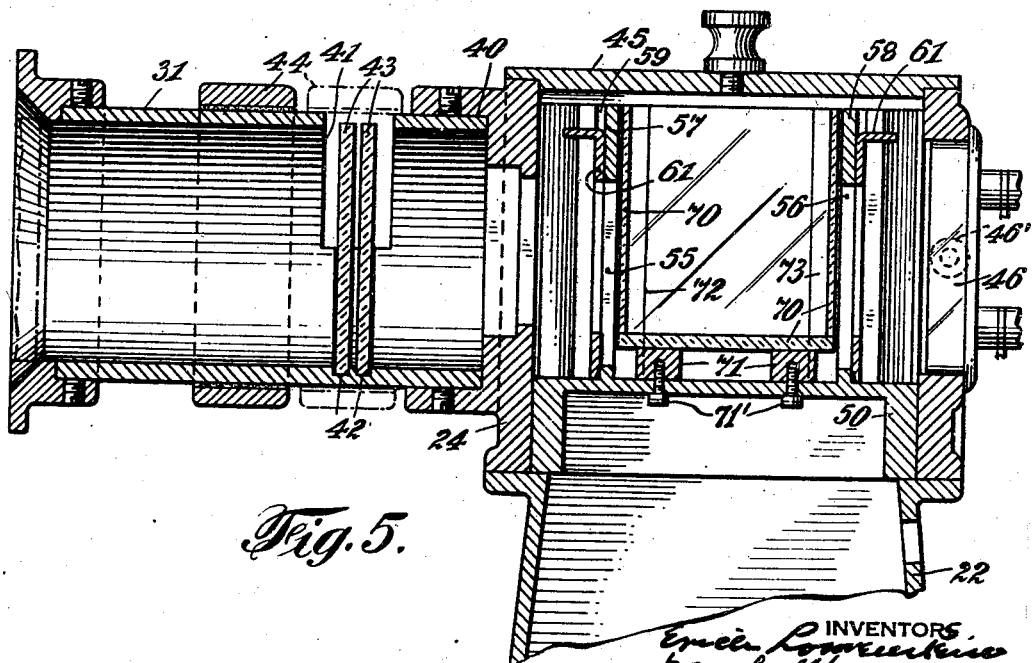

Figures 4 and 5 are fragmentary sectional views, on an enlarged scale, taken respectively on the lines 4—4 and 5—5, Figure 1 of the drawings, and looking in the direction of the arrows.

Figure 6 is a fragmentary transverse section, on an enlarged scale, taken on the line 6—6, Figure 1 of the drawings.

Figure 7 is a view in isometric projection illustrating a carrier element of the apparatus; and Figures 8 and 9 are similar views illustrating respectively a container element and a diaphragm element associated with said carrier element.

Figure 10 is a fragmentary plan view, with a portion broken away, illustrating a modification in the arrangement of the apparatus.

Figures 11 and 12 are respectively a plan view and longitudinal section illustrating a modification in the carrier element and a container retained thereby, the sectional view being taken on the line 12—12, Figure 11 of the drawings.

Figures 13 and 14 are respectively a plan view and a transverse section illustrating a further modification in the carrier element and container retained thereby, the sectional view being taken on the line 14—14, Figure 13 of the drawings.

Figure 15 is a detail, fragmentary, longitudinal section illustrating the manner of sealing the ends of the container illustrated in Figures 13 and 14.

Figures 16 and 17 are respectively a plan view and a transverse section of another form of the carrier element and container retained thereby, the sectional view being taken on the line 17—17, Fig. 16 of the drawings.

Referring to the drawings, 20 designates a suitable base or support for the novel apparatus carrying standards 21 and 22 for mounting respectively a lamp housing 23 and a measuring casing 24; and between these two is supported on the base a control panel 25. The housing 23 retains a lamp 26 having the required characteristics; for example, it may be of the mercury vapor type or a sodium, zinc or cadmium vapor lamp as well as any spectral vapor lamp or a lamp of the gas-filled type. In certain instances, an ordinary Mazda lamp may be utilized, the particular test undertaken determining the character of the lamp utilized. The housing carries also the usual reflector 27 at the rear and a condensing lens system 28 at the front with suitable diaphragm means 29 to control the intensity of the light and replaceable filters 30 provided beyond the lens system for affording different ranges of the spectrum band and combinations thereof. By this arrangement, light of various wave lengths may be projected through a tube or barrel 31 extending in the optical axis of the lens system; and provision is made for adjusting the lamp itself into such optical axis transversely of the base. To this end, a stud 32 extends upwardly from the base and is transversely bored and threaded to receive the theaded end of a stem 33 whose other and outer end is provided with a head 34 for manipulating the stem. The latter passes through the standard 21 of the housing and there are fixed thereon on opposite sides of said standard for contact therewith respective collars 35 and 36, whereby when the stem is rotated a slight transverse adjustment of the housing, which is mounted to slide on the base, may be had.

At the far end of the barrel 31 the same enters an opening 40 of the instrument casing 24; and immediately ahead of said opening the barrel is provided with a transverse semi-circular slot 41 terminating in a series of parallel disposed grooves 42 for retaining one or more spectral filters 43. Slidable over the outer surface of the barrel 31 is a ring element 44 which is temporarily moved axially to expose the filter slot and grooves and then repositioned, as indicated in the dotted line position, Figure 5 of the drawings, in order to shut out any extraneous light so that only the light from the lens system 28 will reach the casing 24 which is designed to be light-sealed, for example, by providing the same at the top with a removable cover 45.

Casing 24 is provided with further openings, one at its far end opposite the opening 40 being closed by a photo-electric cell 46 disposed in the optical axis; and, similarly, a photo-electric cell 47 closes a further opening at the front of said casing, the cells being conveniently held in position by respective set screws 46' and 47'. At the side opposite the photo-electric cell 47, an additional opening in the casing 24 is sealed by a removable plug 48 for the purpose hereinafter set forth. By interposing the barrel 31 between the lamp housing and the instrument casing, not only may the barrel serve to support the desired filters, but the casing will thereby be displaced sufficiently from the lamp housing to avoid undue heating of the photo-electric cells and the material under test which is designed to be retained within the casing.

This test is best effected by means of a carrier or holder or frame member 50, shown more particularly in Figure 7 and designed to be inserted in and removed readily from said casing, in the embodiment shown, after first removing the cover 45. As indicated, the holder is provided with the lateral openings 51 and 52 and the end openings 53, 54, respectively, so that no obstruction to light rays designed to impinge on either of the photo-electric cells will be present nor with respect to the opening 52 when the plug 48 is removed. However, the openings 53 and 54 are reduced to predetermined dimensions as by providing openings or windows 55 and 56, respectively, in corresponding wall portions 57 and 58. These wall portions provide, furthermore, with the corner posts of the carrier, pairs of vertical grooves 59 and 60, respectively, on the outer faces of the walls, which grooves are designed to accommodate diaphragm members 61, for example of the nature shown in Figure 9, to modify the aperture through which the light passes, as may be desired. In certain instances, the member 61 as designed for the grooves 60 may be a solid blank to protect the end cell 46, the other cell 47 alone then being made use of; and, if desired, the diaphragm element may be replaced by filters in certain cases. On the inner faces of the posts vertical grooves are also provided, for example a pair of grooves 62 at the front and a similar pair of grooves 63 at the rear and at right angles to the diaphragm grooves. These grooves 62 and 63 are designed to accommodate the removable filters 64 and 65, respectively.

Between these filters and the openings 55 and 56, as may be modified by the diaphragms 61, there is designed to be positioned the material to be tested, preferably in a container for the sample of material under test. Such container may consist of a rectangular shaped vessel 70 in the nature of a cuvette of glass and which may conveniently be supported upon studs 71 adjustable by turning upon screws 71' threaded into the same and extending through the bottom of the casing for location of the sample at the requisite level. The inner faces of the walls 57 and 58 are formed as channels 72 and 73, respectively, to position properly a container which fits the same snugly but not so tightly that it may not conveniently be removed for substitution of other samples.

The entire carrier 50, moreover, may be substituted by carriers of different construction adapted for accommodating vessels of different sizes and shapes. For example, in place of the rectangular type indicated in Figure 8, the container may take the form of a test tube 75, Figures 11 and 12, as for rapid approximate determinations and serial analyses. This carrier is constructed similarly to the carrier 50 except that a split bar 76 extends longitudinally across the top and is provided with an opening 77 to receive the test tube 75, the bottom of which rests in a seat 78 provided in the bottom 79 of the carrier and thereby supports the test tube in a substantially vertical position. The location of the test tube in its carrier may be central or eccentric in accordance with the opening 77, and different size test tubes may be utilized by the provision of suitable adapter rings (not shown) fitted to the opening 77. Tubes of this nature may conveniently be utilized for titration purposes by observing the change in color.

Where it is desired to project the light through a longer body of liquid, as in turbidity tests when working with very pale and only slightly opaque solutions, the container may be of special form and the holder will be modified accordingly. Thus, in Figures 13 and 14, the bottom of the holder 80 is extended upwardly in the form of a support 81 with semi-circular socket 82 affording a cradle in which may rest a tubular type of container 83 having the funnel filling connection 84 projecting upwardly therefrom. The tube in this instance is also of special construction having its ends closed by transparent parallel disks 85 each of which is held to the tube end to provide a leak-tight joint, as by means of a screw cap 86 which is axially perforated as at 87 to permit light rays to pass therethrough into the solution contained in the tube 83.

A further form of holder and container is indicated in Figures 16 and 17 wherein the container 90 assumes a prismatic form and is particularly suitable for measuring the fluorescence of powders, light striking the hypotenuse face of the prism at an angle of 45° for reflection laterally through the holder 91 to impinge on the photo-electric cell after first passing through suitable filters 92 contained in the holder. This type of container may be used also for the measurement of opacity and reflectance of turbid and colored solutions. The container is conveniently supported in a socket 93 extending upwardly from the bottom of the container, as indicated.

Other forms of containers will readily suggest themselves, being designed in accordance with the particular purpose in view and may include such as will accommodate flowing liquids.

With removable carriers of the different types hereinbefore described and all of the same external dimensions and with the various forms of containers removably supported therein, it is possible to undertake a large variety of determinations with the same apparatus, it being necessary merely to substitute the required container and/or carrier therefor. Moreover, in the provision of a cell not only in the optical axis but at right angles thereto, the scope of the determination may be increased. By removal of the plug 48, disposed opposite the cell 47, it becomes possible to substitute a further source of light 95, Figure 10, retained in a suitable housing 96 which may be attached to the casing 24, being held in position, for example, by a set screw 97. Or, an additional photo-electric cell (not shown) may be substituted for making differential measurements. Suitable filters 98 may be introduced in the path of the light, and various transmission measurements may be effected.

The resulting effect of the light rays impinging on the material, retained in a container, and developed upon one or both of the photo-electric cells, may be measured or indicated in well-known manner upon suitable electrical instruments (not shown) through manipulation of the controls of the control panel 25 to which the respective cells are connected. Said cells, moreover, may possess different or like characteristics.

What I claim is:

1. In photometric apparatus: a lamp housing, together with a suitable source of illumination therein, means to project a beam of light from the housing, a tubular member extending from the housing in the axis of said beam, the tubular member having a transverse opening to admit filter means for the light beam and internal grooves to retain the filter means in a position normal to said beam, a ring element mounted over the periphery of the tubular member and slidable thereover to expose the transverse opening therein and to close the same to shut out from said tubular member extraneous light rays, and a light-sealed instrument casing having in excess of two openings, one receiving the one end of the tubular member, together with a plurality of light-responsive elements closing respective further casing openings and adapted for connection to electrical measuring apparatus.

2. In photometric apparatus: a casing having in excess of two openings, one of which openings only is adapted to pass a beam of light rays from a light source external the said casing, the latter otherwise being sealed against entrance of light, a single transparent container removably mounted within the casing in said beam, and a plurality of light-responsive elements closing further openings of the casing located for optical alignment with the said container, said elements being adapted for connection to electrical measuring apparatus, and a carrier for the container removably fitted and centered within the casing and comprising a base and end walls, the latter apertured to afford windows located in said light beam, one window registering with a said further casing opening when said carrier is supported in the casing, the front of the carrier being open to register with another and front opening of said further openings of the casing and said end walls on their inner surfaces being vertically channeled to provide guides for respective slide members to be located behind said front opening.

3. In photometric apparatus: a casing having in excess of two openings, one of which openings only is adapted to pass a beam of light rays from a light source external the said casing, the latter otherwise being sealed against entrance of light, a single transparent container removably mounted within the casing in said beam, and a plurality of light-responsive elements closing further openings of the casing located for optical alignment with the said container, said elements being adapted for connection to electrical measuring apparatus, and a carrier for the container removably fitted and centered within the casing and comprising a base and end walls, the latter apertured to afford windows located in said light beam, one window registering with a said further casing opening when said carrier is supported in the casing, the front and rear of the carrier being open to register with the corresponding front and rear openings of said further openings of the casing and said end walls on their inner surfaces being vertically channeled to provide guides for respective slide members to be located behind said front and rear openings.

4. In photometric apparatus: a casing having in excess of two openings, one of which openings only is adapted to pass a beam of light rays from a light source external the said casing, the latter otherwise being sealed against entrance of light, a single transparent container removably mounted within the casing in said beam, and a plurality of light-responsive elements closing further openings of the casing located for optical alignment with the said container, said elements being adapted for connection to electrical measuring apparatus, and a carrier for the container removably fitted and centered within the casing and comprising a base and end walls, the latter apertured to afford windows located in said light beam, one window registering with a said further casing opening when said carrier is supported in the casing, the front of the carrier being open to register with another and front opening of said further openings of the casing and said end walls on their inner surfaces being vertically channeled to provide guides for respective slide members to be located behind said front openings, and on their front faces being vertically channeled to provide guides for respective slide members before the windows of said walls.

DOUGLAS J. HENNESSY.
ERICH LOEWENSTEIN.